US012700308B2

(12) United States Patent
  Dingli et al.

(10) Patent No.: US 12,700,308 B2
(45) Date of Patent: Aug. 4, 2026

(54) AUTOMATIC NAVIGATION BASED ON TRAFFIC MANAGEMENT VEHICLES AND ROAD SIGNS

(71) Applicant: PlusAI, Inc., Santa Clara, CA (US)

(72) Inventors: Robert Joseph Dingli, Cupertino, CA (US); Joseph Michael Martin, Munich (DE); Anurag Ganguli, Saratoga, CA (US); Ankur Agarwal, San Jose, CA (US)

(73) Assignee: PlusAI, Inc., Santa Clara, CA (US)

( * ) Notice: Subject to any disclaimer, the term of this patent is extended or adjusted under 35 U.S.C. 154(b) by 45 days.

(21) Appl. No.: 18/745,845

(22) Filed: Jun. 17, 2024

(65) Prior Publication Data

US 2025/0046187 A1    Feb. 6, 2025

Related U.S. Application Data

(63) Continuation of application No. 18/229,524, filed on Aug. 2, 2023, now Pat. No. 12,046,137.

(51) Int. Cl.
| | |
|---|---|
| G08G 1/0968 | (2006.01) |
| G06V 20/58 | (2022.01) |
| G08G 1/0967 | (2006.01) |
| H04W 4/40 | (2018.01) |

(52) U.S. Cl.
CPC ......... G08G 1/0968 (2013.01); G06V 20/582 (2022.01); G08G 1/096725 (2013.01); G08G 1/096775 (2013.01); H04W 4/40 (2018.02)

(58) Field of Classification Search
CPC .......... G08G 1/0968; G08G 1/096725; G08G 1/096775; H04W 4/40; G06V 20/582

USPC ........................................................ 701/117
See application file for complete search history.

(56) References Cited

U.S. PATENT DOCUMENTS

| | | | |
|---|---|---|---|
| 9,008,369 | B2 | 4/2015 | Schofield et al. |
| 9,191,634 | B2 | 11/2015 | Schofield et al. |
| 9,336,448 | B2 * | 5/2016 | Fowe ................... G08G 1/0112 |
| 9,428,192 | B2 * | 8/2016 | Schofield ................... B60R 1/24 |
| 9,609,289 | B2 * | 3/2017 | Schofield ................... G06T 7/20 |
| 9,736,435 | B2 * | 8/2017 | Schofield ............... G06V 20/58 |
| 9,805,601 | B1 * | 10/2017 | Fields ................... G06F 18/214 |
| 9,948,904 | B2 * | 4/2018 | Schofield ............... B60K 35/60 |
| 10,015,452 | B1 * | 7/2018 | Schofield ................. B60Q 1/08 |
| 10,071,676 | B2 * | 9/2018 | Schofield ............... B60K 31/00 |
| 10,110,860 | B1 | 10/2018 | Schofield et al. |
| 10,187,615 | B1 | 1/2019 | Schofield et al. |
| 10,306,190 | B1 | 5/2019 | Schofield et al. |
| 10,462,426 | B2 | 10/2019 | Schofield et al. |
| 10,528,055 | B2 | 1/2020 | Kappauf et al. |

(Continued)

OTHER PUBLICATIONS

International Search Report and Written Opinion mailed Aug. 30, 2024 for International Application No. PCT/US2024/040371, filed Jul. 31, 2024, 6 pages.

*Primary Examiner* — Luis A Martinez Borrero
(74) *Attorney, Agent, or Firm* — Rimon Law, P.C.

(57) ABSTRACT

Methods, systems, and non-transitory computer readable media are configured to perform operations comprising determining an occurrence of a sign in an environment of a vehicle; determining that at least a portion of the sign is unrecognized by a local machine learning model of the vehicle; and providing sensor data associated with the at least one portion of the sign to an operations center remote from the vehicle.

20 Claims, 12 Drawing Sheets

(56)                References Cited

U.S. PATENT DOCUMENTS

| | | | | |
|---|---|---|---|---|
| 10,670,416 | B2* | 6/2020 | Wheeler | G01C 21/3638 |
| 10,735,695 | B2 | 8/2020 | Schofield et al. | |
| 10,762,365 | B2 | 9/2020 | Ewert | |
| 11,341,845 | B2* | 5/2022 | Zhang | G08G 1/0141 |
| 11,380,110 | B1* | 7/2022 | Ben Yaacov | G06V 20/647 |
| 11,503,253 | B2 | 11/2022 | Schofield et al. | |
| 11,885,625 | B1* | 1/2024 | McGavran | G01C 21/32 |
| 12,046,137 | B1* | 7/2024 | Dingli | G08G 1/096725 |
| 12,208,816 | B2* | 1/2025 | Iwaki | B60W 30/143 |
| 12,315,223 | B2* | 5/2025 | Bravi | G06V 20/582 |
| 12,354,377 | B2* | 7/2025 | Tanikawa | G06V 10/82 |
| 2007/0027583 | A1* | 2/2007 | Tamir | G06Q 30/0283 |
| | | | | 701/1 |
| 2013/0049988 | A1* | 2/2013 | Roeber | G08G 1/0967 |
| | | | | 340/905 |
| 2014/0362221 | A1* | 12/2014 | Schofield | B60R 1/12 |
| | | | | 348/148 |
| 2018/0120857 | A1* | 5/2018 | Kappauf | G01S 17/931 |
| 2018/0188045 | A1* | 7/2018 | Wheeler | G06V 10/98 |
| 2018/0300964 | A1* | 10/2018 | Lakshamanan | G06N 20/10 |
| 2019/0114493 | A1* | 4/2019 | Ewert | G06V 20/582 |
| 2019/0122550 | A1* | 4/2019 | Muehlmann | G08G 1/096725 |
| 2019/0303693 | A1* | 10/2019 | Watanabe | G05D 1/0287 |
| 2019/0325237 | A1* | 10/2019 | Zhang | G06V 20/582 |
| 2020/0033875 | A1* | 1/2020 | An | H04W 4/38 |
| 2020/0151611 | A1* | 5/2020 | McGavran | H04W 4/44 |
| 2020/0284883 | A1* | 9/2020 | Ferreira | G01S 7/4815 |
| 2020/0401823 | A1* | 12/2020 | Miller | G06N 3/08 |
| 2021/0027117 | A1 | 1/2021 | McGavran et al. | |
| 2021/0166052 | A1* | 6/2021 | Park | G06F 18/214 |
| 2021/0172744 | A1* | 6/2021 | Raut | G06N 5/04 |
| 2022/0126864 | A1* | 4/2022 | Moustafa | B60W 60/0013 |
| 2022/0161815 | A1 | 5/2022 | Van Beek et al. | |
| 2022/0207652 | A1* | 6/2022 | Garcia-Dorado | B60R 11/04 |
| 2022/0379913 | A1* | 12/2022 | Rodriguez Hervas | |
| | | | | B60W 60/001 |
| 2023/0127230 | A1* | 4/2023 | Molnar | B60W 10/20 |
| | | | | 701/23 |
| 2024/0336281 | A1* | 10/2024 | Jafari | G06V 20/588 |

* cited by examiner

Sensor Data

Map Data

Local Sign Processing
102

Central Sign Processing
104

Local Sign Processing Module 200

Detection Module
202

Recognition
Module
204

Response Module
206

Determine an occurrence of a sign in an environment of a vehicle
502

Determine that at least a portion of the sign is unrecognized by a local machine learning model of the vehicle
504

Provide sensor data associated with the at least one portion of the sign to an operations center remote from the vehicle
506

Vehicle <u>600</u>

Autonomous System <u>610</u>

Perception Module <u>612</u>

Prediction and Planning Module <u>616</u>

Data Store <u>620</u>

Localization Module <u>614</u>

Control Module <u>618</u>

AUTOMATIC NAVIGATION BASED ON TRAFFIC MANAGEMENT VEHICLES AND ROAD SIGNS

CROSS-REFERENCE TO RELATED APPLICATIONS

This application is a continuation of U.S. patent application Ser. No. 18/229,524, filed on Aug. 2, 2023, and entitled "AUTOMATIC NAVIGATION BASED ON TRAFFIC MANAGEMENT VEHICLES AND ROAD SIGNS", which is incorporated in its entirety herein by reference.

FIELD OF THE INVENTION

The present technology relates to vehicle systems. More particularly, the present technology relates to automatic navigation based on traffic management vehicles and variable road signs.

BACKGROUND

Some vehicles can have both a manual mode of navigation and an autonomous mode of navigation. For example, in an autonomous mode of navigation, which can have different levels of autonomy, motion of a vehicle can be planned and controlled. Planning and control functions in the autonomous mode of navigation rely in part on data about the vehicle and an environment in which the vehicle is traveling, including the position and movement of other vehicles and objects. Navigation in the autonomous mode also relies on correct recognition and understanding of a wide array of disparate road signage.

SUMMARY

Various embodiments of the present technology can include methods, systems, and non-transitory computer readable media configured to perform operations comprising determining an occurrence of a sign in an environment of a vehicle; determining that at least a portion of the sign is unrecognized by a local machine learning model of the vehicle; and providing sensor data associated with the at least one portion of the sign to an operations center remote from the vehicle.

In some embodiments, the at least one portion of the sign is the entirety of the sign.

In some embodiments, the determining that at least a portion of the sign is unrecognized comprises: extracting from the sign a first sign element that is recognized by the local machine learning model; and extracting from the sign a second sign element that is unrecognized by the local machine learning model.

In some embodiments, the operations further comprise: providing to the operations center a request for navigation guidance to plan motion for the vehicle in response to the at least a portion of the sign and associated scenario context data; and slowing down or stopping motion of the vehicle behind the sign pending receipt of the navigation guidance.

In some embodiments, the operations further comprise: receiving from the operations center the navigation guidance including an action to be performed by the vehicle in response to the at least a portion of the sign.

In some embodiments, the operations further comprise: performing the action; generating assessment data including safety considerations of the performed action; and providing the assessment data to the operations center.

In some embodiments, a central machine learning model configured to recognize variable signage and associated with the operations center is retrained based on the assessment data generated by the vehicle and other assessment data generated by other vehicles in a fleet.

In some embodiments, the retrained central machine learning model is periodically distributed to the vehicle and the other vehicles in the fleet to update local machine learning models maintained by the vehicle and the other vehicles.

In some embodiments, the sign includes a plurality of sign elements, the at least a portion of the sign includes a first sign element that is unrecognized by the vehicle, and the sign includes a second sign element that is recognized by the vehicle. The operations further comprise: performing an action responsive to the second sign element when the first sign element is unrecognized if performance of the action does not violate a safety rule.

In some embodiments, the sign includes a plurality of sign elements, the at least a portion of the sign includes a first sign element that is unrecognized by the vehicle, and the sign includes a second sign element that is recognized by the vehicle. The operations further comprise: not performing an action responsive to the second sign element until navigation guidance from the operations center is provided for the first sign element.

It should be appreciated that many other embodiments, features, applications, and variations of the present technology will be apparent from the following detailed description and from the accompanying drawings. Additional and alternative implementations of the methods, non-transitory computer readable media, systems, and structures described herein can be employed without departing from the principles of the present technology.

BRIEF DESCRIPTION OF THE DRAWINGS

FIG. 2A illustrates an example local sign processing module, according to embodiments of the present technology.

Figure 1:
FIG. 1 illustrates an example simplified functional block diagram associated with signage recognition and response in vehicle navigation, according to embodiments of the present technology.
Figure 1:
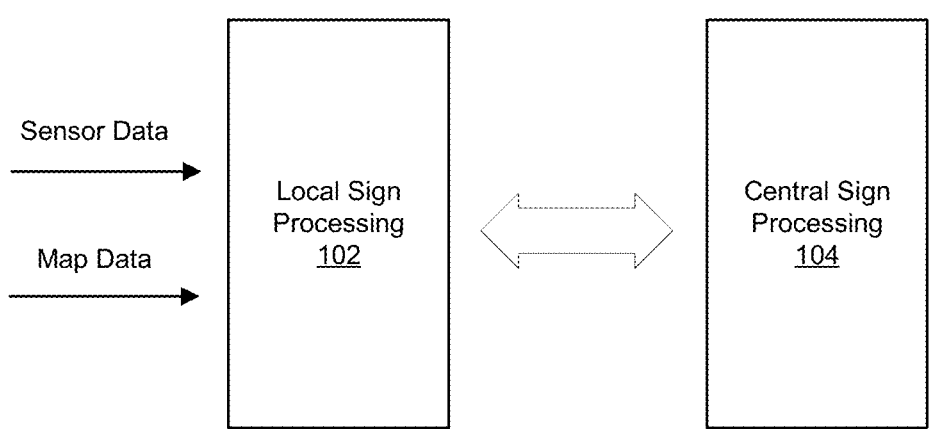

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Some vehicles can have both a manual mode of navigation and an autonomous mode of navigation. For example, in an autonomous mode of navigation, which can have different levels of autonomy, motion of an ego vehicle can be planned and controlled. Planning and control functions in the autonomous mode of navigation rely in part on data about the ego vehicle and an environment in which the ego vehicle is traveling, including the position and movement of other vehicles and objects. Navigation in the autonomous mode also relies on correct recognition and understanding of a wide array of disparate road signage.

One challenge for perception subsystems is the significant variation in road signage. Extensive variation in a broad array of different possible environmental conditions have resulted in extensive variation in signage to reflect those environmental conditions or provide appropriate navigation directions in response to environmental conditions. For example, a sign can indicate a wide assortment of environmental conditions, such as standing water, crossing animals, a dead end, a school zone, a winding road, a slippery road surface, food availability, etc. As another example, a sign can instruct certain navigation behavior, such as a particular speed limit, yielding to traffic, changing lanes, etc.

Signage can further vary based on disparate levels of complexity in environmental conditions or navigation instructions conveyed by the signage. For example, an upcoming road hazard can be indicated by a certain sign. However, a need for a vehicle to change lanes based on the location of the upcoming road hazard can require a different, more complex sign. Further, a need for the vehicle to yield to other traffic before changing lanes based on the upcoming road hazard can require yet a different, even more complex sign. Signs thus frequently reflect different levels of complexity to describe complicated or dynamic environmental conditions or provide appropriate navigation instruction.

Other factors are responsible for significant variation in signage. For example, the type and appearance of signage can change according to geography or political subdivision. For instance, even when an indication of the same environmental condition is to be conveyed through signage, the environmental condition can be indicated through one type of sign in one geographic region but another type of sign in another geographic region. Likewise, an indication of a navigation instruction can be expressed in certain terms or in a certain language in one geographic region and in other terms or in another language in another geographic region. Further, geographical features, road conditions, safety standards, cultural norms, or other factors unique to one geographic region may result in the utilization of certain signs that are not utilized in another geographic region with different factors unique to it.

Conventional perception subsystems supporting autonomous modes of navigation in vehicles are unable to handle the full array of signage that vehicles may confront on the road. Rather, conventional perception subsystems may be able to recognize only a modest number of certain common, simple signs (e.g., generic speed limits, direction arrows, etc.). This limited capability results from the ubiquity of common, simple signs on the road and thus the availability of large amounts of sensor data capturing such signs to adequately train perception models to recognize the signs. In contrast, a large number of signs are less frequently or rarely encountered, and thus appear in significantly smaller amounts of sensor data. As a result, training data in the amounts needed to adequately train perception models to recognize less common signs is often difficult or impossible to obtain. Accordingly, the ability of conventional perception models to recognize less common signs is significantly limited. When a vehicle implementing a conventional perception model is unable to recognize and react to a sign, vehicle navigation can become uncertain and unsafe.

The present technology provides improved approaches for vehicles in autonomous modes of navigation to handle variable signage that overcome the aforementioned and other technological disadvantages. According to the present technology, an autonomous system of a vehicle can detect an occurrence of a new object as a sign. The sign and an associated scenario context can be reflected in sensor data captured by the vehicle. The sign can be deconstructed or parsed into component sign elements. Sign elements can include portions of the sign that contain, for example, text, symbols, graphics, lighting, etc. Sign elements (e.g., common sign elements) that are recognized by the autonomous system or, in particular, an onboard database of previously identified signage, can result in responsive route planning for the vehicle in response to the recognized sign elements, subject to relevant safety considerations.

When a sign element is not recognized by the onboard database, the vehicle can take appropriate action. For example, when the sign is stationary, the vehicle can slow down to stop behind the sign. As another example, when the sign is moving, such as a sign associated with a traffic management vehicle, the vehicle can follow behind the sign. The vehicle can send image data of the unrecognized sign element and related scenario context data to a remote operations center. Based on the image data and the scenario context data, the operations center can determine an appropriate action for the vehicle and accordingly send back to the vehicle an authorization or direction to carry out the action. The vehicle can plan a route or maneuver in accordance with the action provided by the operations center.

After completing the action, the vehicle can send to the operations center assessment data regarding the safety or effectiveness of executing the action in response to the unrecognized sign element. A central database configured to recognize variable signage and associated with the operations center can be updated based on the assessment data. The central database can be similarly updated based on assessment data relating to detection by other vehicles of unrecognized signs or sign elements. The central database as updated can be distributed over the air to the vehicle and a fleet of vehicles. In this way, a vehicle can incorporate and leverage the knowledge base of a remote operations center and continually learn the experience of other vehicles through periodic over the air updates. These and other inventive features and related advantages of the various embodiments of the present technology are discussed in more detail herein.

FIG. 1 illustrates an example simplified functional block diagram of a system 100, according to some embodiments of the present. The system 100 can support an autonomous mode of navigation of a vehicle that enables recognition of and proper responses to variable signage. Variable signage can include any type of sign. As some examples, a sign can be a sign associated with a traffic management vehicle, a standalone sign, a temporary sign, or a permanent sign. As other examples, a sign can be a sign positioned within a lane of a road, a sign standing on a side of a road, a sign overhanging a road, a sign painted on the road, and the like.

As still other examples, a sign can be a static sign, a dynamic sign (e.g., electronic display), a mobile sign, a stationary sign, a digital sign, a non-digital sign, etc. As yet other examples, a sign can be a sign including any number of sections or elements arranged in any configurations or combinations, any color or colors, any language(s), etc. As a further example, a sign can utilize symbols, graphics, illustrations, text, illumination (e.g., LEDs), or other types of mechanisms, subject matter, or content to indicate any type of environmental condition or navigation instruction, such as road work, a construction zone, exercise of caution, an accident, road curvature, a speed limit, falling debris, pedestrians, merging lanes, a school zone, a railroad crossing, a rest stop, a ramp, etc. The system 100 can include local sign processing 102 and central sign processing 104. Local sign processing 102 can be implemented by the vehicle. Central sign processing 104 can be implemented by a server system or remote operations center in over the air communication with the vehicle and other vehicles. In some embodiments, local sign processing 102 can be performed by perception and planning subsystems (e.g., perception module 612, localization module 614, prediction and planning module 616) of a vehicle (e.g., vehicle 600).

Local sign processing 102 can obtain sensor data and map data. The sensor data can include data captured by various sensors of the vehicle. The sensor data can include data about an environment of the vehicle. For example, the sensor data can include image data (e.g., images, video) regarding objects in the environment that can be recognized by computer vision techniques. The objects can include signs. The sensor data also can include scenario context data about the surroundings of the vehicle. The map data can be acquired by local sign processing 102 from a map maintained by the vehicle. For example, the map can be a high definition (semantic) map that includes stored map data about objects in the environment traveled by the vehicle. The objects reflected in the map data can include signs.

Local sign processing 102 can apply a detection technique to the sensor data to determine whether the occurrence of a new object in the environment of the vehicle is a sign. For example, local sign processing 102 can perform a comparison between the map data and an object reflected in the sensor data. The sensor data can include, for example, data describing the location of the object. When the object reflected in the sensor data does not match or otherwise correspond to an object in the map data, local sign processing 102 can determine that the object is new.

Local sign processing 102 can determine whether the detected new object is a sign and, if so, whether the sign is recognized or not. For example, to determine whether the object is a sign, local sign processing 102 can utilize a detection model (e.g., machine learning model) that has been trained to detect signs. The detection model can be trained based on, for example, training data reflecting the general structure and appearance of a variety of signs. If the object is determined to be a sign, local sign processing 102 can compare the sign with a local onboard database (e.g., local machine learning model) of previously recognized signs. If the sign can be found in the onboard database with a sufficient confidence level, the sign can be deemed recognized. In some instances, scenario context data associated with a sign can be further compared with scenarios maintained in the onboard database. In the event of a match between scenario context data and a scenario in the onboard database, the sign can be recognized with a higher level of confidence. If the sign is recognized, local sign processing 102 can plan appropriate motion for the vehicle in response to the sign. For example, the onboard database can maintain a record (e.g., look up table) of navigation plans or trajectories that are appropriate for and responsive to recognized signs. If a sign is not recognized, local sign processing 102 can communicate sensor data associated with the unrecognized sign to central sign processing 104 for assistance. While the foregoing illustration references a recognized or unrecognized sign, functionality of local sign processing 102 can apply analogously to extracted sign elements (or portions) of a sign that are recognized or unrecognized. Functionality of local sign processing 102 is described in more detail herein.

Central sign processing 104 can analyze the sensor data associated with the unrecognized sign. For example, manual analysis of the sensor data can allow for determination of the meaning of the unrecognized sign. Based on such analysis, central sign processing 104 can determine an appropriate action for the vehicle to execute in response to the sign. Central sign processing 104 can communicate the action as navigation guidance to the vehicle so that vehicle motion can proceed accordingly. Central sign processing 104 can receive from the vehicle assessment data regarding execution by the vehicle of the action. The assessment data can describe the outcome, safety, or level of success in the executed action in response to the sign. Central sign processing 104 can communicate in this manner with a fleet of vehicles that encounter unrecognized signs.

Central sign processing 104 can update a central database (e.g., machine learning model) based on the assessment data to facilitate recognition of the previously unrecognized sign. In addition, central sign processing 104 can update the central database based on the assessment data so that appropriate actions responsive to the sign can be maintained. Central sign processing 104 can periodically provide the updated central database to the fleet of vehicles as updates to the onboard databases of the vehicles. The updated onboard databases can optimize the ability of the vehicles to recognize and appropriately react to a wide variation in signage. While the foregoing illustration references an unrecognized sign, functionality of central sign processing 104 can apply analogously to extracted sign elements (or portions) of a sign that are unrecognized. Functionality of central sign processing 104 is described in more detail herein.

While some of the examples discussed herein may expressly reference a recognized sign or an unrecognized sign for purposes of illustration, the present technology can apply in an analogous manner to a recognized sign element or an unrecognized sign element of a sign. Likewise, while some of the examples discussed herein may expressly reference a recognized sign element or an unrecognized sign element of a sign for purposes of illustration, the present technology can apply in an analogous manner to a recognized sign or an unrecognized sign as a whole.

In some embodiments, some or all of the functionality performed by the system 100 may be performed by one or more computing systems implemented in a vehicle. In some embodiments, some or all of the functionality performed by the system 100 may be performed by one or more backend computing systems (e.g., remote from a vehicle). In some embodiments, some or all of the functionality performed by the system 100 may be performed by one or more computing systems associated with (e.g., carried by) one or more users riding in a vehicle. In some embodiments, some or all data processed and/or stored by the system 100 can be stored in a data store (e.g., local to the system 100) or other storage system (e.g., cloud storage remote from the system 100).

The components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the system 100 can be implemented in any suitable combinations. Functionalities of the system 100 or variations thereof may be further discussed herein or shown in other figures.

As referenced or suggested herein, autonomous vehicles can include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, based on the SAE standard, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

Figure 2A:
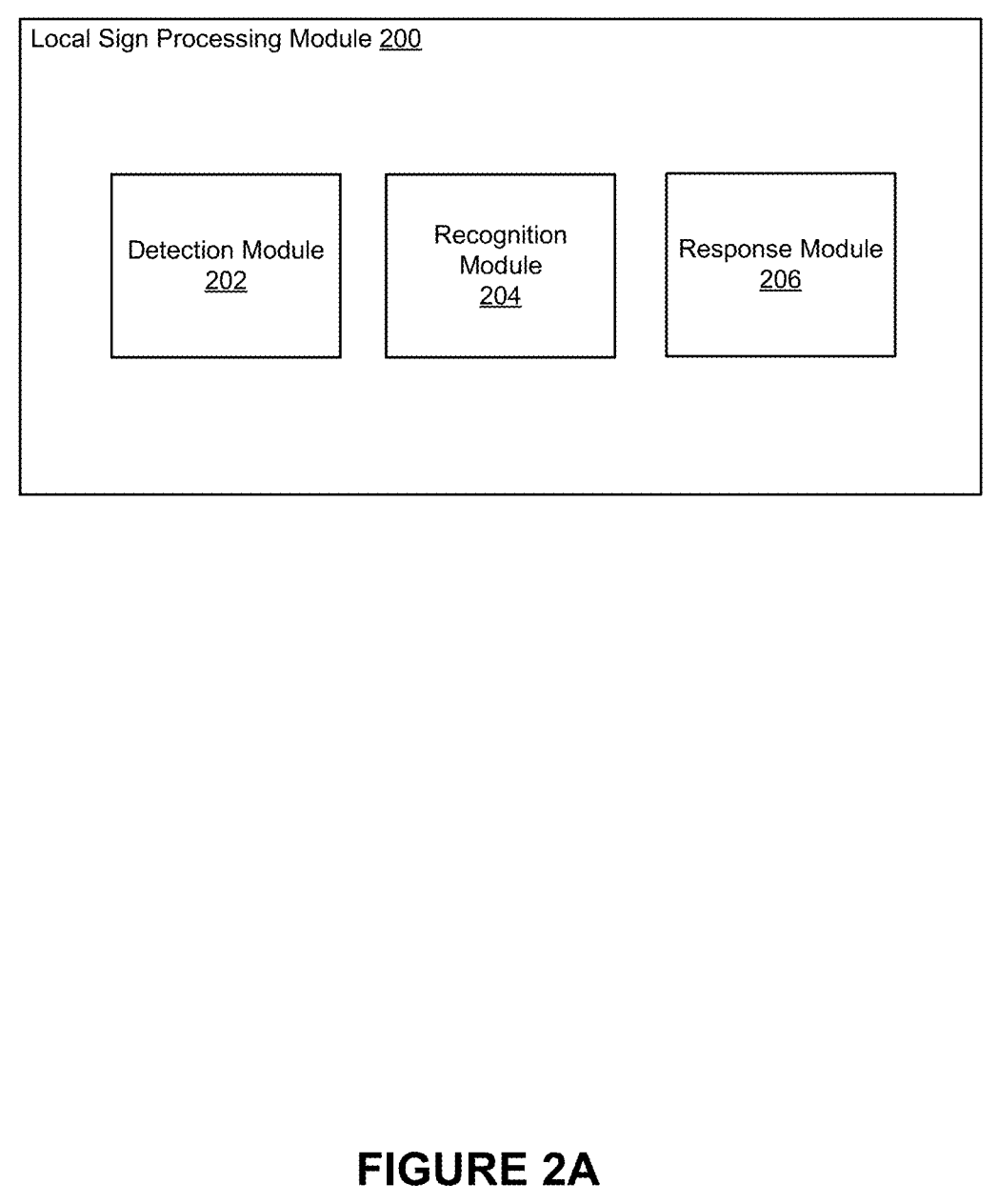
Figure 2B:
FIGS. 2B-2D illustrate example analysis of a sign and sign elements, according to embodiments of the present technology.

FIG. 2A illustrates an example local sign processing module 200, according to an embodiment of the present technology. The local sign processing module 200 can be implemented on a vehicle. In some embodiments, the local sign processing module 200 can be an implementation of local sign processing 102 of FIG. 1. The local sign processing module 200 can detect the occurrence of a new sign in an environment of a vehicle and determine a plan for vehicle motion in response to the sign. The local sign processing module 200 can include a detection module 202, a recognition module 204, and a response module 206. Functionality of the local sign processing module 200 is discussed in relation to FIGS. 2A-2D. As stated above, the components (e.g., modules, elements, etc.) shown in this figure and all figures herein, as well as their described functionality, are exemplary only. Other implementations of the present technology may include additional, fewer, integrated, or different components and related functionality.

The detection module 202 can determine the occurrence of a new object in an environment of the vehicle. The detection module 202 can detect the existence of an object based on sensor data captured by sensors of the vehicle. For example, the object may be ahead of the vehicle and within the range of sensors capable of detecting the object. The sensor data associated with the object can be compared with a map (e.g., high definition (HD) map) to determine whether map data includes an entry about or record of the object. For instance, the location of the object as reflected in the sensor data can be used to look up whether the map includes an object at the same location. If the map data does not reflect the existence of the object, the detection module 202 can determine that the object is new. For example, the object indicated in the sensor data may have arisen after the last update of the map and, as a result, is not reflected in the map data.

The detection module 202 can determine if the new object is a sign. The detection module 202 can apply a detection model (e.g., machine learning model) to the sensor data associated with the object to determine if the sensor data reflects the occurrence of a sign. For example, the detection model can be trained with training data that can include image data of signs along with labels identifying the image data as signs. The training data can reflect or describe, for example, the appearances, profiles, shapes, dimensions, supporting structures, associated vehicles, content, languages, text, numerical values, etc. included in or otherwise associated with signs. For example, the training data can reflect or describe traffic management vehicles and their associated signs. Other types of information to facilitate the detection of signs also can be utilized as features for training the detection model. After the detection model is trained, sensor data associated with a detected object can be provided to the detection model. The detection model can determine whether the object is a sign. For example, if the detection model determines that an object reflected in the sensor data is a sign with a confidence level that satisfies a confidence level threshold value, the detection module 202 can determine the existence of a sign in the environment of the vehicle.

Figure 2C:
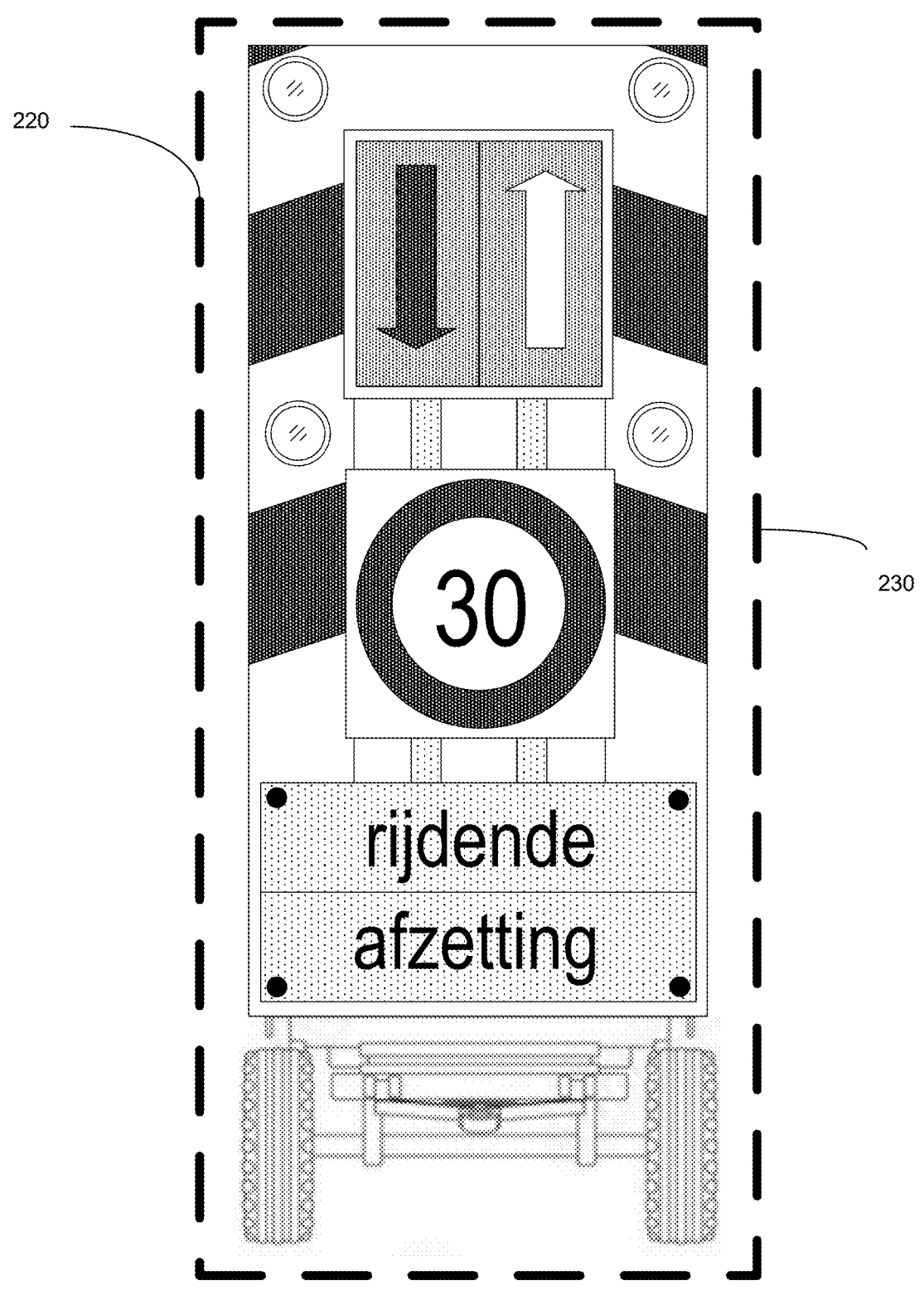

For example, as shown in FIG. 2B, an object 220 is reflected in sensor data, such as image data (e.g., frame data, video data), captured by the vehicle. The detection module 202 can provide the sensor data to a detection model trained to detect signs. In this example, the object 220 exhibits feature values consistent with a sign. For example, as shown in FIG. 2C, the object 220 has an overall appearance, size, and supporting structure of a traffic warning sign associated with a traffic management vehicle. Accordingly, the detection model can output an indication that the object 220 is a sign along with a confidence level that satisfies a confidence level threshold value. Based on the output, the detection module 202 can determine that the object 220 is a sign 230.

The recognition module 204 can determine whether a sign is recognized (or categorized) or unrecognized (or uncategorized). The recognition module 204 can analyze a sign as a whole. In addition, the recognition module 204 can parse and extract, as applicable, component sign elements that in combination constitute the entirety of a sign. The recognition module 204 can determine if the entirety of a sign is unrecognized or if one or more sign elements of the sign are unrecognized. A sign or its sign elements can be unrecognized in various contexts. As some examples, a sign in its entirety can be new (e.g., not previously utilized on the road); a sign may include one or more sign elements that are unrecognized; a portion or an entirety of a sign may be occluded by an object or other substance (e.g., graffiti); a sign may be damaged from collisions, weather, vandalism, etc.; and the like. As mentioned, an unrecognized sign or portion thereof can include any symbols, graphics, illustrations, text, illumination (e.g., LEDs), or other types of mechanisms, subject matter, or content in any combination to indicate a relevant environmental condition or traffic direction.

An onboard database can include recognized signs and sign elements and related scenarios. For example, the onboard database can include a local machine learning model (e.g., neural network) trained to recognize signs and sign elements. Training data for the local machine learning model can include signs or sign elements that are known or have been previously encountered by a fleet of vehicles (e.g., speed limits, general caution symbols, arrows directing traffic in a particular direction, etc.), as well as labels identifying the signs and sign elements. As discussed in more detail herein, the machine local learning model can be periodically updated and provided by a remote operations center.

A sign or sign element can be provided to the local machine learning model, and the local machine learning model can provide an identification of the sign or the sign element and a confidence level for the identification. A recognized sign or sign element can be one that the local machine learning model can identify with a threshold level of confidence. An unrecognized sign or sign element can be one that the local machine learning model does not identify with a threshold level of confidence. In some instances, a sign (or sign element) and surrounding environmental data can be further compared with scenarios maintained in the onboard database. In the event of a match, the sign can be recognized with a higher level of confidence. A local map (or central map) of the vehicle can be updated to reflect the recognized sign in map data. In some embodiments, sensor data (e.g., image data) associated with a sign (or sign elements thereof) and a relevant scenario context can be provided to a remote operations center that can include a central machine learning model (e.g., neural network) and scenarios database to determine whether a sign or sign elements thereof are recognized or not, and the determination can be returned to the vehicle.

Figure 2D:
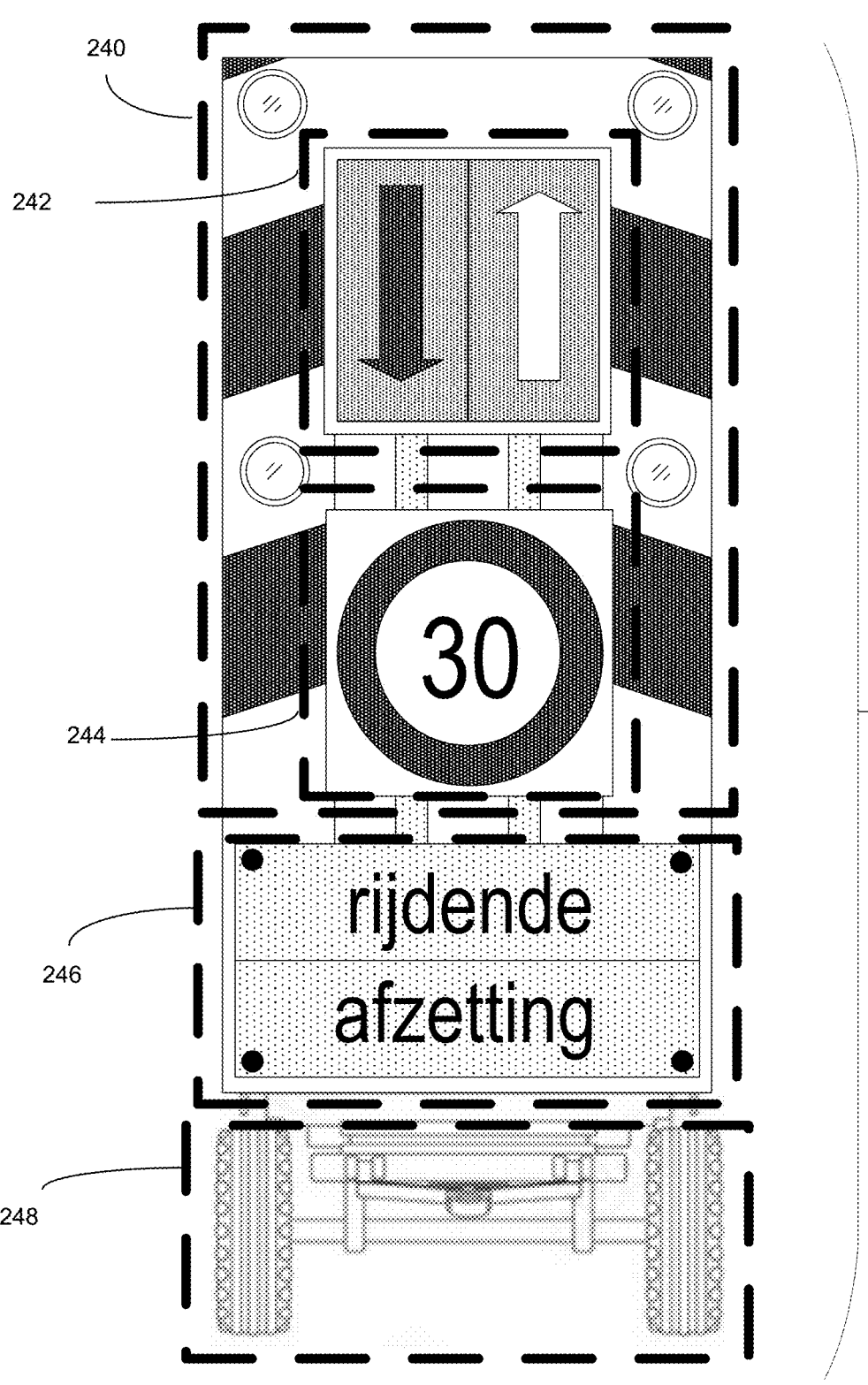

In the example shown in FIG. 2D, the recognition module 204 can segment, extract, and identify features or portions of the sign 230 as sign elements. In the example shown, the sign 230 can be associated with traffic management and structured for transport by a trailer that can be attached to a traffic management vehicle. The sign 230 can include a first sign element 240, a second sign element 246, and a third sign element 248. The first sign element 240 can include a first sign sub-element 242 and a second sign sub-element 244. The first sign element 240 can be a section of the sign 230 that contains graphic or symbolic indications, warnings, or instructions. The first sign sub-element 242 can be a section of the sign 230 that indicates directions of traffic and right of way. The second sign sub-element 244 can be a section of the sign 230 that indicates a speed limit under which the vehicle should travel. The second sign element 246 can be a section of the sign 230 that contains human language. The third sign element 248 can be a section of the sign 230 that supports or transports the sign 230. In this example, the second sign sub-element 244, the second sign element 246, and the third sign element 248 are commonly encountered while the first sign sub-element 242 is not commonly encountered. For example, a sign can be common (or commonly encountered) when the sign satisfies a threshold value relating to a frequency of occurrence of the sign. For instance, a frequency of occurrence of a sign can be expressed as a ratio between a number of occurrences of the sign during a distance traveled versus the distance traveled. Likewise, a sign can be uncommon (or uncommonly encountered) when the sign fails to satisfy a threshold value relating to a frequency of occurrence of the sign.

The recognition module 204 thus can determine that the second sign sub-element 244, the second sign element 246, and the third sign element 248 are found in the onboard database of the vehicle while the first sign sub-element 242 is not found in the onboard database of the vehicle. As a result, the second sign sub-element 244, the second sign element 246, and the third sign element 248 are recognized. The response module 206 can determine appropriate actions to be planned for navigation of the vehicle in response to the second sign sub-element 244 and the second sign element 246. The actions can be maintained in the onboard database of the vehicle that includes a listing of common signs that may be encountered by the vehicle and corresponding actions to be planned and performed in response to the common signs. The actions can be determined based on appropriate, effective, or successful actions performed by the vehicle and other vehicles in a fleet in response to previous encounters with the common signs. The response module 206 can determine that the third sign element 248 is merely structural support for the sign 230 that does not warrant consideration in planning navigation of the vehicle.

The foregoing is merely an illustration. The present technology can analyze signs having different appearance and content and including different sign elements and sub-elements arranged in different configurations. The present technology can apply to any variation in signage. In addition, the foregoing illustration involves a portion of a sign that is unrecognized by the vehicle. In other examples, the present technology can apply to the entirety of a sign when the entirety of the sign is unrecognized by the vehicle. For instance, an unrecognized sign may not be capable of being segmented into multiple sign elements. In another instance, all of the sign elements into which a sign is segmented can be unrecognized. Many variations are possible.

In some embodiments, actions can be taken by the vehicle in response to sign elements of a sign that are recognized even if one or more sign elements of the sign are not recognized. The response module 206 can cause the vehicle to navigate according to the actions as long as certain rules or conditions are satisfied. For example, the conditions can be associated with relevant safety rules or standards that should not be violated without authorization from the operations center. In some embodiments, the vehicle can seek authorization from the operations center to perform an action that may be inconsistent with a relevant rule or condition. The operations center can account for a relevant scenario context or environmental conditions in determining whether to authorize the action. The vehicle will not perform the action until it receives authorization from the operations center. For example, a safety standard by which the vehicle is in part controlled can dictate that the vehicle should not normally cross into a lane with oncoming traffic. Further, in this example, the vehicle may recognize a sign element of a sign instructing a switch to a left lane that is to the left of the lane in which the vehicle is currently traveling. Further still, in this example, the vehicle may not recognize another sign element of the sign. If the vehicle is traveling in one lane (right lane) of a two-lane road with two directions of travel, the response module 206 does not immediately cause the vehicle to cross into the oncoming lane because such a maneuver would violate the safety standard. Rather, the response module 206 can send a request to the operations center to obtain authorization to cross into the oncoming lane. The operations center can account for the scenario context and environmental conditions before determining whether to authorize the vehicle to cross into the oncoming lane. In contrast, if the vehicle is traveling in a far right lane of a road having two additional lanes with the same direction of traffic, the response module 206 can plan motion that would bring the vehicle into the lane that is to the left of the lane currently being traveled by the vehicle. Such motion can be planned without authorization from the operations center because no violation of the safety standard would occur. In some embodiments, the response module 204 does not perform vehicle navigation in response to any sign element of a sign unless all sign elements of the sign are recognized or navigation guidance is provided for all unrecognized sign elements. For example, if a first sign element of a sign is not recognized but a second sign element of the sign is recognized, the vehicle will not take action in response to the second sign element until the vehicle obtains navigation guidance including appropriate action to be performed in response to the first sign element.

Because the first sign sub-element 242 is not recognized, data associated with the first sign sub-element 242 can be provided over the air to a remote operations center for further processing. The data provided to the remote operations center can include sensor data associated with features of the first sign sub-element 242 as well as scenario context data. Scenario context data can include any data relevant to or associated with a sign or sign element, such as the position of the sign on a map, surrounding objects, behaviors of surrounding traffic and pedestrians, other non-traffic elements, and the like. The response module 206 can cause the vehicle to slow down or stop pending further guidance from the operations center. For example, if the vehicle is approaching a moving traffic management vehicle to which a sign is attached, the vehicle can slowly follow the traffic management vehicle. As another example, if the vehicle is approaching a stationary sign, the response module 206 can cause the vehicle to stop behind the sign. As discussed in more detail herein, the operations center can analyze an unrecognized sign or sign element along with scenario context data, determine the meaning of the unrecognized sign or sign element, and provide responsive navigation guidance for the vehicle. The navigation guidance can include an authorization or a direction for the vehicle to take certain action in response to the unrecognized sign or sign element. The operations center can analyze and account for the scenario context when determining the action. Upon receipt of the navigation guidance, the previously unrecognized sign element can be deemed recognized. The response module 206 can plan motion for the vehicle that is consistent with the action set forth in the navigation guidance along with any actions determined by the onboard database of the vehicle in response to recognized sign elements. Further, the response module 206 can update a local map (or central map) to reflect the now recognized sign element and related features (e.g., meaning, appearance, position, pose, etc.) in the map data.

The response module 206 can obtain sensor data associated with performance of the action set forth in the navigation guidance provided by the operations center. The response module 204 can provide assessment data regarding the performed action. The assessment data can include a qualitative or quantitative description of a path or maneuver executed by the vehicle in response to an unrecognized sign or unrecognized sign element. The assessment data can also indicate the safety or effectiveness of the performed action. For example, the assessment data can indicate that the vehicle traveled an authorized or instructed path and complied with all relevant safety requirements or standards in traveling the path. Alternatively, the assessment data can indicate that the vehicle violated a relevant safety requirement or standard in traveling the path. As another example, the assessment data can further indicate that the vehicle maintained or violated a requirement or standard relating to fuel economy or comfortability in execution of an authorized or instructed action. The assessment data can be provided as feedback to the operations center to further update or train a central database or a central machine learning model based on the previously unrecognized sign or sign element and the responsive action taken by the vehicle as indicated in the navigation guidance provided by the operations center.

Figure 3:
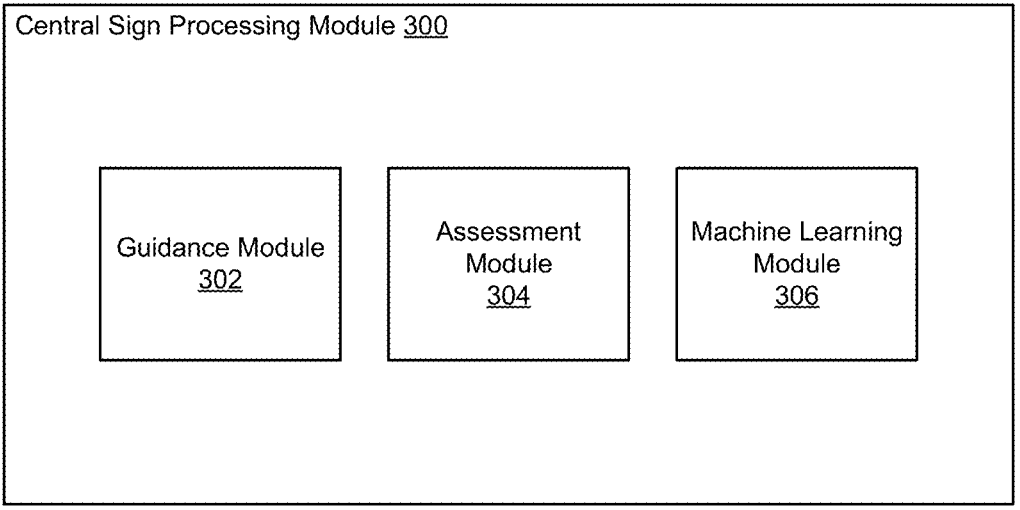
FIG. 3 illustrates an example central sign processing module, according to embodiments of the present technology.

FIG. 3 illustrates an example central sign processing module 300, according to an embodiment of the present technology. The central sign processing module 300 can be implemented remote from a vehicle. For example, the central sign processing module 300 can be implemented in part through a remote server system or an associated remote operations center that provides guidance and support for a fleet of vehicles including vehicles that can implement functionality of the local sign processing module 200, as described. In some embodiments, the central sign processing module 300 can be an implementation of central sign processing 104 of FIG. 1. The central sign processing module 300 can receive requests from vehicles to provide navigation guidance for signs or sign elements that are not recognized by the vehicles. The central sign processing module 300 can include a guidance module 302, an assessment module 304, and a machine learning model 306. As stated above, the components (e.g., modules, elements, etc.) shown in this figure and all figures herein, as well as their described functionality, are exemplary only. Other implementations of the present technology may include additional, fewer, integrated, or different components and related functionality. The operations center can be associated with the central sign processing module 300 and a central database. The operations center can perform its functions based on i) a separate, independent computation system (e.g., machine learning model(s)) that may be separately trained from or otherwise more powerful than a local perception system deployed to a vehicle, ii) a human performing manual analysis, or iii) a combination of the foregoing. The central database of the operations center can maintain images of all recognized and unrecognized signs encountered or otherwise known by a fleet of vehicles in a central knowledge repository. For example, an unrecognized sign can be added to the central database for future reference and for training one or more perception systems for future updates. More details regarding the functions of the operations center are provided herein.

The guidance module 302 can receive a request from a vehicle to provide navigation guidance in response to an unrecognized sign element. The request for navigation guidance can be accompanied by sensor data captured by the vehicle. The sensor data can include data associated with relevant features of a sign element as well as data describing a scenario context in which the sign element appears. The data describing the scenario context can include the presence and motion of objects in an environment of the vehicle, such as other vehicles, traffic lighting, pedestrians, debris, road conditions, weather conditions, and the like.

Based on the sensor data and map data describing the environment of the vehicle, the guidance module 302 can analyze and determine the meaning of an unrecognized sign element. The guidance module 302 also can generate an action to be potentially performed by the vehicle in response to the determined meaning of the unrecognized sign element. The determination of the meaning of the unrecognized sign element and the generation of the responsive action can account for and be consistent with the associated scenario context. For example, if an unrecognized sign element is determined to indicate that a vehicle should proceed to a lane to the right of the current lane traveled by the vehicle, the sensor data and the map data should indicate that a lane to the right of the vehicle exists and that entry into this lane would be safe.

The guidance module 302 also can receive a request from a vehicle to provide navigation guidance in relation to a proposed action to be performed by the vehicle in response to a recognized sign element that would violate a navigation rule or condition. The guidance module 302 can evaluate the safety and effectiveness of the proposed action based on the sensor data, including scenario context data, and map data. If the guidance module 302 determines that the proposed action is appropriate, the guidance module 302 can provide to the vehicle an authorization to perform the proposed action. If the guidance module 302 determines that the proposed action is not appropriate, the guidance module 302 does not return to the vehicle an authorization to perform the proposed action or can delay provision of such authorization until the proposed action is appropriate.

In some embodiments, determination or evaluation of an action responsive to a recognized or unrecognized sign element can be generated by a human operator in the operations center. In some embodiments, a human operator can utilize simulation software system to test the action. For example, the guidance module 302 can provide the simulation software system with the sensor data and the map data to re-create in a virtual rendering the vehicle and the environment of the vehicle. In the virtual rendering, the simulation software system can cause the vehicle to virtually perform the action responsive to the sign element as a test. The simulated performance of the determined action by the vehicle can provide a human operator with information regarding the safety, propriety, and effectiveness of the action. After a check to ensure that the action is appropriate and safe, an authorization or an instruction to perform the action can be generated for the vehicle. The guidance module 302 can provide to the vehicle navigation guidance including the authorized or instructed action to be performed by the vehicle in response to the sign element. Many variations are possible. For instance, some examples set forth above involve an unrecognized sign element of a sign. However, as discussed, the present technology also can apply to the unrecognized entirety of a sign as a whole.

The assessment module 304 can receive assessment data as feedback regarding performance by the vehicle of the action authorized or instructed by the guidance module 302. The assessment data can indicate that the performed action has been completed by the vehicle so that the operations center can consider handling of the unrecognized or recognized sign element in question as completed. Further, as discussed, the assessment data can include data regarding the sign element and an indication of the safety or effectiveness of the performed action in response to the sign element. The assessment module 304 can provide the assessment data to the machine learning module 306.

The machine learning module 306 can utilize a central database including a central machine learning model to recognize a wide variety of signage. Training data to train or re-train the central machine learning model can be based on the assessment data. As the central sign processing module 300 receives more assessment data relating to various unrecognized signs or unrecognized sign elements from a fleet of vehicles, the machine learning module 306 can further train and update the central machine learning model. Training data from the fleet of vehicles can facilitate the acquisition of a selected number of instances (e.g., 500, 1,000, 2,000, etc.) of training data required to train the central machine learning model to reliably recognize a sign or sign element. Training of the central machine learning model based on various signs or sign elements that are not recognized by the fleet of vehicles in this manner causes the central machine learning model to be increasingly robust in its ability to recognize different signs. At periodic or non-periodic intervals, the central machine learning model as updated can be distributed over the air to the fleet of vehicles as updates to local machine learning models to improve the ability of the vehicles to recognize and respond to a wider array of signage.

Figure 4A:
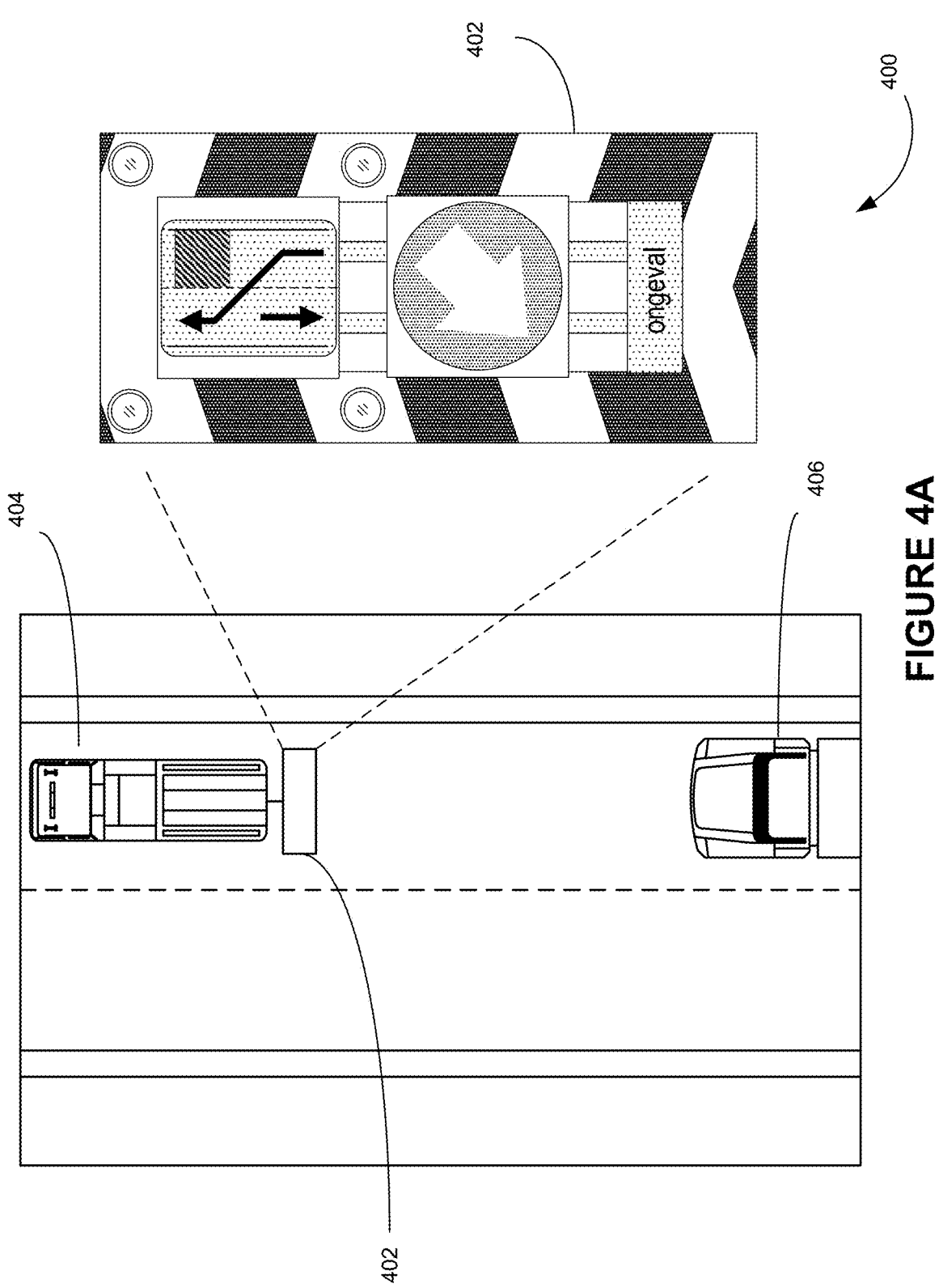
FIGS. 4A-4C illustrate an example scenario involving sign recognition, according to embodiments of the present technology.
Figure 4B:
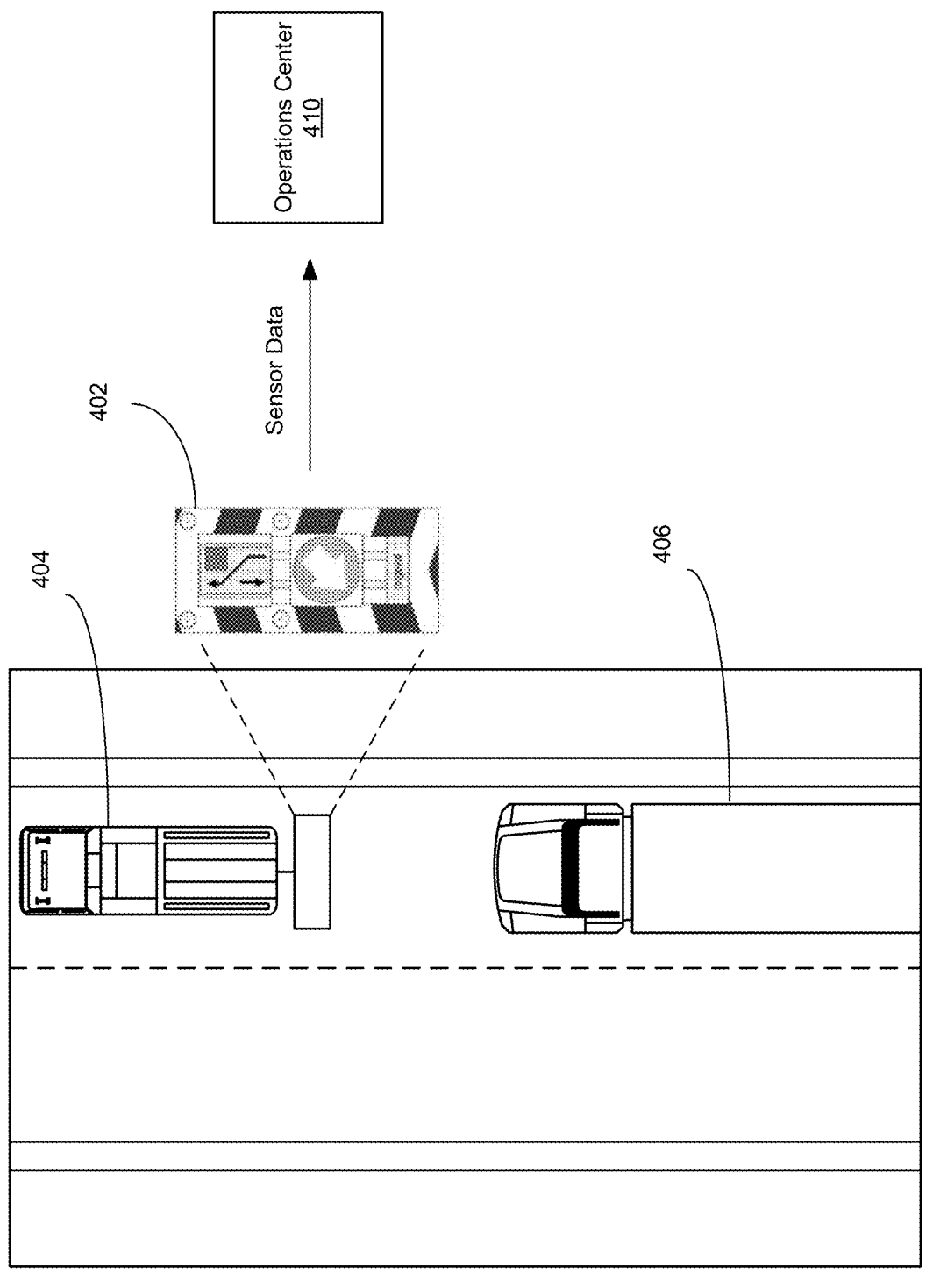
Figure 4C:
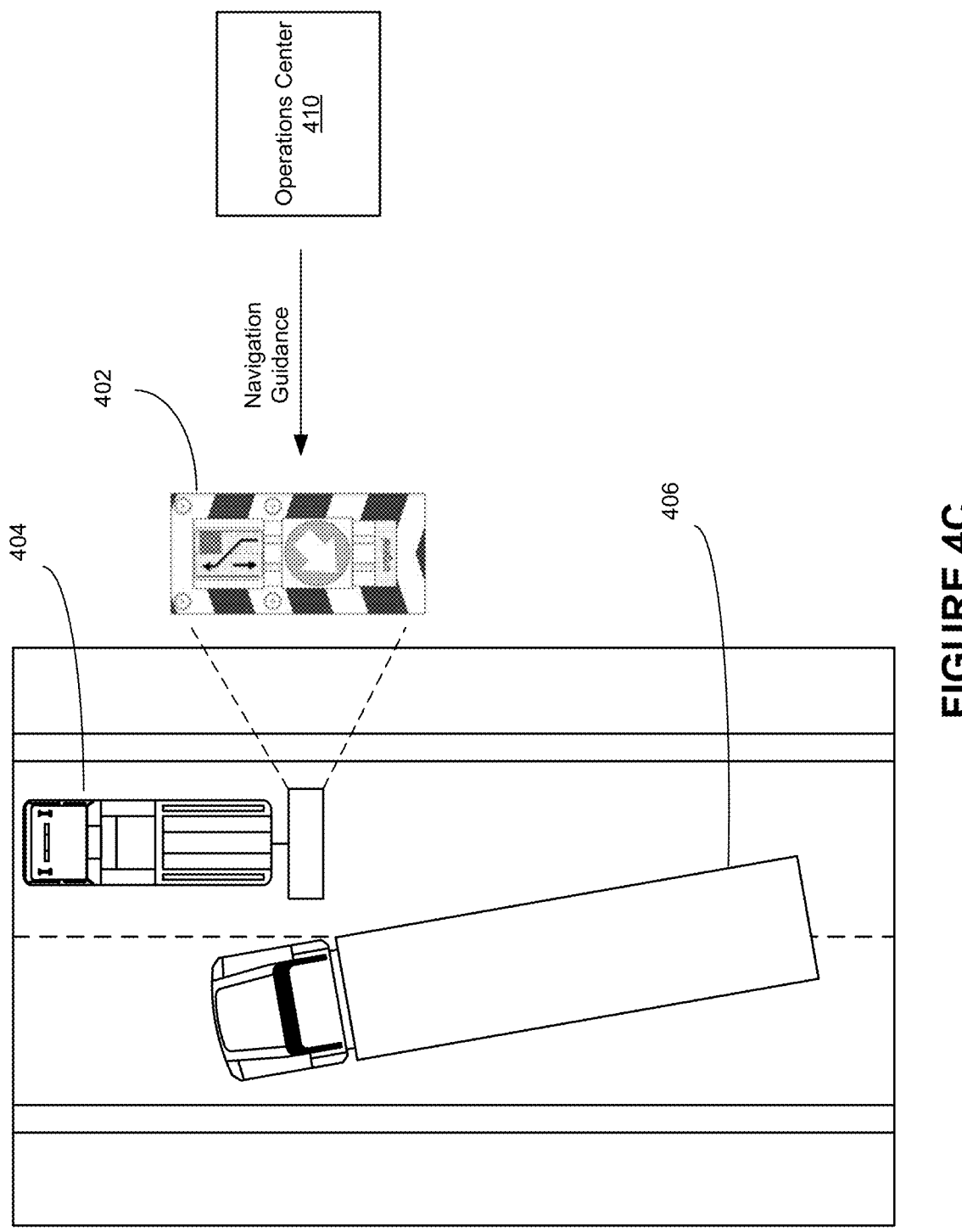

FIGS. 4A-4C illustrate an example scenario context 400, according to an embodiment of the present technology. As shown in FIG. 4A, the scenario context 400 includes a sign 402 associated with a traffic management vehicle 404. The scenario context 400 also includes a vehicle 406 (e.g., a truck) operating in an autonomous mode of navigation. In some embodiments, the vehicle 406 can implement functionality of the local sign processing module 200. The vehicle 406 is approaching the sign 402. Sensors on the vehicle 406 can capture sensor data of an environment in which the vehicle 406 is traveling. The sensor data can include various features of the sign 402, such as appearance, dimensions, configuration, content, color, language, position, pose, and the like. The sensor data also can include data about the environment or a scenario context in which the sign 402 appears. In this example, the sign 402 is detected as a new object based on the sensor data and map data. Then, the object is determined to be a sign—i.e., the sign 402.

The sign 402 as a whole, not merely a sign element of the sign 402, is determined to be unrecognized. For example, the vehicle 406 can segment the sign 402 into various sign elements. The various sign elements can be extracted and analyzed by the vehicle 402. For example, an onboard database or local machine learning model can be utilized to attempt to recognize the sign elements and to generate suggested actions to be performed by the vehicle 402 in response to the sign elements. In this example, all sign elements of the sign 402 are not recognized by the vehicle 402. The sign 402 can be unrecognized because the sign 402 is uncommon or infrequently encountered by a fleet of vehicles that can provide training data to train an associated central machine learning model. In other examples, a sign that is not susceptible or ill-suited to segmentation may be determined to be unrecognized as a whole.

The vehicle 406 can provide the sensor data over the air to a remote operations center 410 in communication with the vehicle 406, as shown in FIG. 4B. For example, image data of the sign 402 can be provided to the operations center 410. The vehicle 406 also can request navigation guidance from the operations center 410 to take appropriate action in response to the sign 402. As the vehicle 406 awaits navigation guidance from the operations center 410, the vehicle 406 can slow down or stop as it approaches the traffic management vehicle 404.

Based on the sensor data and map data, the operations center 410 can determine the meaning of the sign 402. For example, the operations center 410 can determine that the sign 402 provides a warning about an upcoming road hazard in the lane currently traveled by the vehicle 406 and an instruction to proceed in a different lane subject to right of way considerations. Based on the meaning of the sign 402, the operations center 410 can generate navigation instructions that authorize or instruct one or more actions to be performed by the vehicle 406 in response to the sign 402. For example, the actions can include moving to a left lane subject to the right of way. The navigation instructions can be provided to the vehicle 406. Upon receipt of the navigation instructions, the vehicle 406 can generate a plan for motion of the vehicle 406 in accordance with the actions determined by the operations center 410, as shown in FIG. 4C.

After execution of the actions in response to the sign 402, the vehicle 406 can provide to the operations center 410 assessment data regarding the safety and effectiveness of the actions. The operations center 410 can update or re-train a central database or machine learning model based on the assessment data. The central machine learning model can be trained to recognize wide variation in signage and to support generation of responsive motion planning in response to the signage. When the central machine learning model is updated based on the assessment data associated with the sign 402 as well as other signs that are not recognized by a fleet of vehicles, the capability of the central machine learning model to handle variable signage is enhanced. The operations center 410 can periodically distribute the updated central machine learning model to the fleet of vehicles to bolster the capabilities of the vehicles to locally recognize and react to variable signage. While the example scenario context 400 involves an unrecognized sign as a whole, the present technology can apply equally to another scenario context that involves an unrecognized sign element, as discussed herein.

Figure 5:
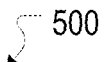
FIG. 5 illustrates an example method, according to embodiments of the present technology.
Figure 5:
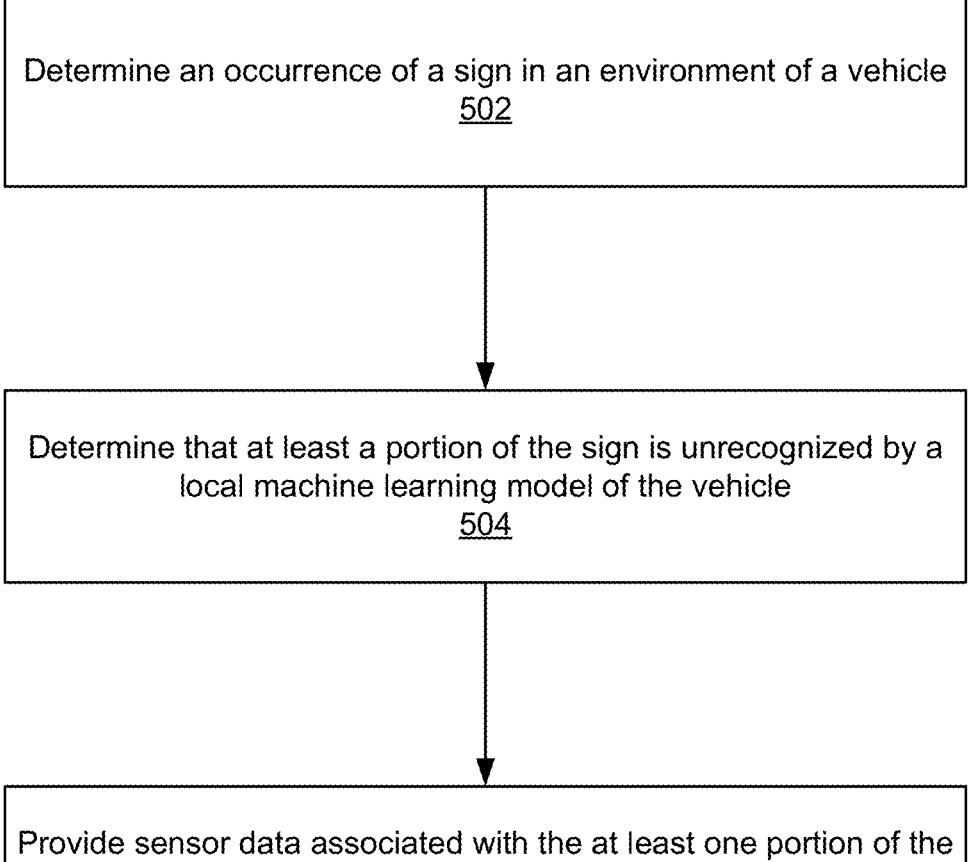

FIG. 5 illustrates an example method 500, according to embodiments of the present technology. At block 502, the method 500 can determine an occurrence of a sign in an environment of a vehicle. At block 504, the method 500 can determine that at least a portion of the sign is unrecognized by a local machine learning model of the vehicle. At block 506, the method 500 can provide sensor data associated with the at least one portion of the sign to an operations center remote from the vehicle. Many variations to the example method are possible. It should be appreciated that there can be additional, fewer, or alternative steps performed in similar or alternative orders, or in parallel, within the scope of the various embodiments discussed herein unless otherwise stated.

It is contemplated that there can be many other uses, applications, and/or variations associated with the various embodiments of the present technology. For example, various embodiments of the present technology can learn, improve, and/or be refined over time.

Example Implementations

Figure 6:
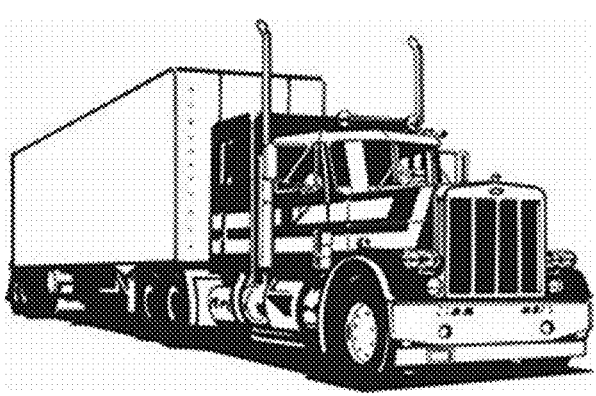
FIG. 6 illustrates an example vehicle, according to embodiments of the present technology.
Figure 6:
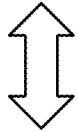

FIG. 6 illustrates a vehicle 600 including an autonomous system 610, according to various embodiments of the present technology. The functionality and operation of the present technology, including the autonomous system 610, can be implemented in whole or in part by the vehicle 600. The present technology can cause desired control and navigation of the vehicle 600, as described herein. In some embodiments, the vehicle 600 is a truck, which can include a trailer. The truck can be of any size (e.g., medium truck, heavy truck, very heavy truck, etc.) or weight (e.g., greater than 14,000 pounds, greater than 26,000 pounds, greater than 70,000 pounds, etc.). The autonomous system 610 of the vehicle 600 can support and execute various modes of navigation of the vehicle 600. The autonomous system 610 can support and execute an autonomous driving mode, a semi-autonomous driving mode, and a driver assisted driving mode of the vehicle 600. The autonomous system 610 also can enable a manual driving mode. For operation of the vehicle 600, the autonomous system 610 can execute or enable one or more of the autonomous driving mode, the semi-autonomous driving mode, the driver assisted driving mode, and the manual driving mode, and selectively transition among the driving modes based on a variety of factors, such as operating conditions, vehicle capabilities, and driver preferences.

In some embodiments, the autonomous system 610 can include, for example, a perception module 612, a localization module 614, a prediction and planning module 616, and a control module 618. The functionality of the perception module 612, the localization module 614, the prediction and planning module 616, and the control module 618 of the autonomous system 610 are described in brief for purposes of illustration. As mentioned, the components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the autonomous system 610 can be implemented in any suitable combinations.

The perception module 612 can receive and analyze various types of data about an environment in which the vehicle 600 is located. Through analysis of the various types of data, the perception module 612 can perceive the environment of the vehicle 600 and provide the vehicle 600 with critical information so that planning of navigation of the vehicle 600 is safe and effective. For example, the perception module 612 can determine the pose, trajectories, size, shape, and type of obstacles in the environment of the vehicle 600. Various models, such as machine learning models, can be utilized in such determinations.

The various types of data received by the perception module 612 can be any data that is supportive of the functionality and operation of the present technology. For example, the data can be attributes of the vehicle 600, such as location, velocity, acceleration, weight, and height of the vehicle 600. As another example, the data can relate to topographical features in the environment of the vehicle 600, such as traffic lights, road signs, lane markers, landmarks, buildings, structures, trees, curbs, bodies of water, etc. As yet another example, the data can be attributes of dynamic obstacles in the surroundings of the vehicle 600, such as location, velocity, acceleration, size, type, and movement of vehicles, persons, animals, road hazards, etc.

Sensors can be utilized to capture the data. The sensors can include, for example, cameras, radar, LiDAR (light detection and ranging), GPS (global positioning system), IMUs (inertial measurement units), and sonar. The sensors can be appropriately positioned at various locations (e.g., front, back, sides, top, bottom) on or in the vehicle 600 to optimize the collection of data. The data also can be captured by sensors that are not mounted on or in the vehicle 600, such as data captured by another vehicle (e.g., another truck) or by non-vehicular sensors located in the environment of the vehicle 600.

The localization module 614 can determine the pose of the vehicle 600. Pose of the vehicle 600 can be determined in relation to a map of an environment in which the vehicle 600 is traveling. Based on data received by the vehicle 600, the localization module 614 can determine distances and directions of features in the environment of the vehicle 600. The localization module 614 can compare features detected in the data with features in a map (e.g., HD map) to determine the pose of the vehicle 600 in relation to the map. The features in the map can include, for example, traffic lights, crosswalks, road signs, lanes, road connections, stop lines, etc. The localization module 614 can allow the vehicle 600 to determine its location with a high level of precision that supports optimal navigation of the vehicle 600 through the environment.

The prediction and planning module 616 can plan motion of the vehicle 600 from a start location to a destination location. The prediction and planning module 616 can generate a route plan, which reflects high level objectives, such as selection of different roads to travel from the start location to the destination location. The prediction and planning module 616 also can generate a behavioral plan with more local focus. For example, a behavioral plan can relate to various actions, such as changing lanes, merging onto an exit lane, turning left, passing another vehicle, etc. In addition, the prediction and planning module 616 can generate a motion plan for the vehicle 800 that navigates the vehicle 600 in relation to the predicted location and movement of other obstacles so that collisions are avoided. The prediction and planning module 616 can perform its planning operations subject to certain constraints. The constraints can be, for example, to ensure safety, to minimize costs, and to enhance comfort.

Based on output from the prediction and planning module 616, the control module 618 can generate control signals that can be communicated to different parts of the vehicle 600 to implement planned vehicle movement. The control module 618 can provide control signals as commands to actuator subsystems of the vehicle 600 to generate desired movement. The actuator subsystems can perform various functions of the vehicle 600, such as braking, acceleration, steering, signaling, etc.

The autonomous system 610 can include a data store 620. The data store 620 can be configured to store and maintain information that supports and enables operation of the vehicle 600 and functionality of the autonomous system 610. The information can include, for example, instructions to perform the functionality of the autonomous system 610, data captured by sensors, data received from a remote computing system, parameter values reflecting vehicle states, map data, machine learning models, algorithms, vehicle operation rules and constraints, navigation plans, etc.

The autonomous system 610 of the vehicle 600 can communicate over a communications network with other computing systems to support navigation of the vehicle 600. The communications network can be any suitable network (e.g., wireless, over the air, wired, etc.) through which data can be transferred between computing systems. Communications over the communications network involving the vehicle 600 can be performed in real time (or near real time) to support navigation of the vehicle 600.

The autonomous system 610 can communicate with a remote computing system (e.g., server, server farm, peer computing system) over the communications network. The remote computing system can include an autonomous system, and perform some or all of the functionality of the autonomous system 610. In some embodiments, the functionality of the autonomous system 610 can be distributed between the vehicle 600 and the remote computing system to support navigation of the vehicle 600. For example, some functionality of the autonomous system 610 can be performed by the remote computing system and other functionality of the autonomous system 610 can be performed by the vehicle 600. In some embodiments, a fleet of vehicles including the vehicle 600 can communicate data captured by the fleet to a remote computing system controlled by a provider of fleet management services. The remote computing system in turn can aggregate and process the data captured by the fleet. The processed data can be selectively communicated to the fleet, including vehicle 600, to assist in navigation of the fleet as well as the vehicle 600 in particular. In some embodiments, the autonomous system 610 of the vehicle 600 can directly communicate with a remote computing system of another vehicle. For example, data captured by the other vehicle can be provided to the vehicle 600 to support navigation of the vehicle 600, and vice versa. The vehicle 600 and the other vehicle can be owned by the same entity in some instances. In other instances, the vehicle 600 and the other vehicle can be owned by different entities.

In various embodiments, the functionalities described herein with respect to the present technology can be implemented, in part or in whole, as software, hardware, or any combination thereof. In some cases, the functionalities described with respect to the present technology can be implemented, in part or in whole, as software running on one or more computing devices or systems. In a further example, the functionalities described with respect to the present technology can be implemented using one or more computing devices or systems that include one or more servers, such as network servers or cloud servers. It should be understood that there can be many variations or other possibilities.

Figure 7:
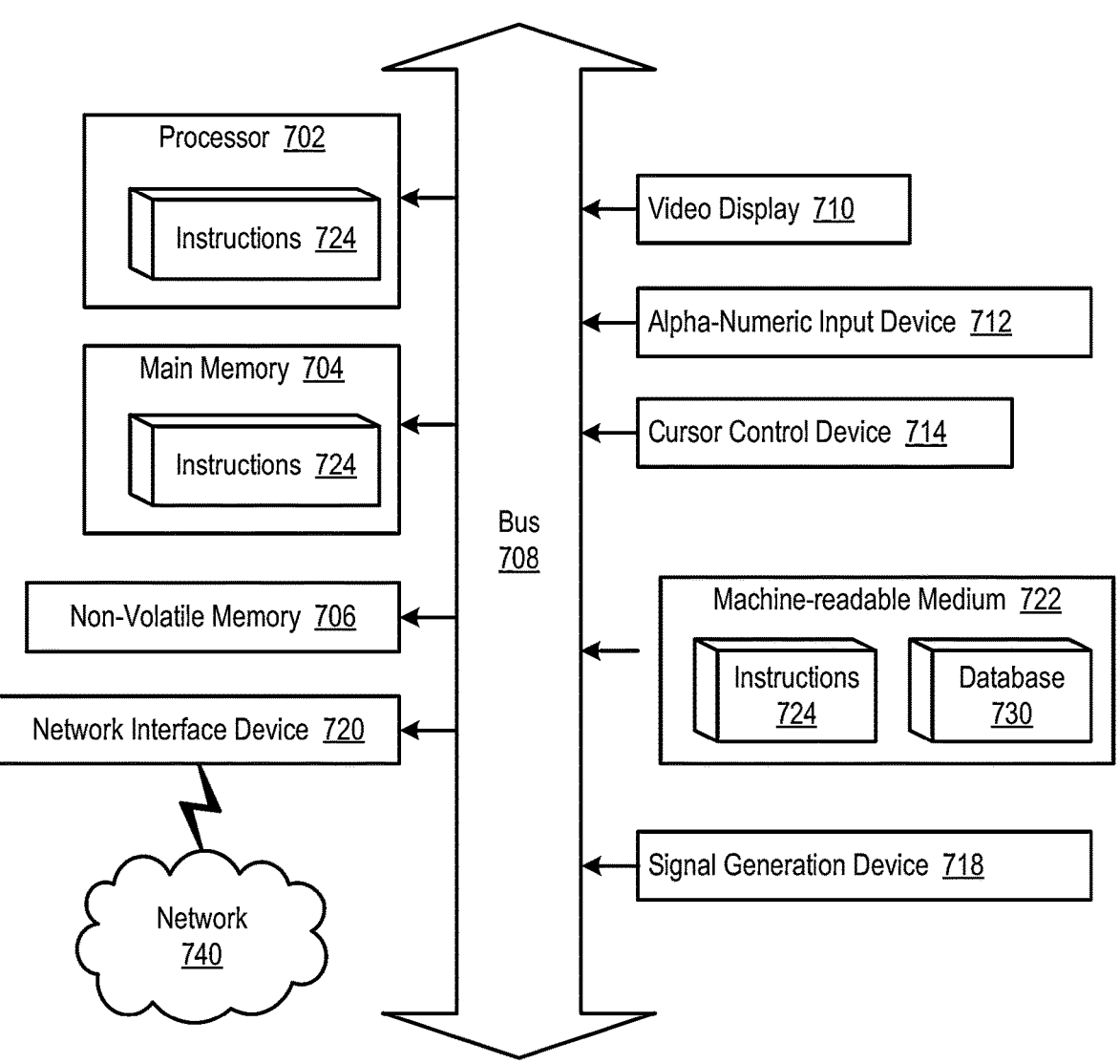
FIG. 7 illustrates an example computing system, according to embodiments of the present technology.

FIG. 7 illustrates an example of a computer system 700 that may be used to implement one or more of the embodiments of the present technology. The computer system 700 can be included in a wide variety of local and remote machine and computer system architectures and in a wide variety of network and computing environments that can implement the functionalities of the present technology. The computer system 700 includes sets of instructions 724 for causing the computer system 700 to perform the functionality, features, and operations discussed herein. The computer system 700 may be connected (e.g., networked) to other machines and/or computer systems. In a networked deployment, the computer system 700 may operate in the capacity of a server or a client machine in a client-server network environment, or as a peer machine in a peer-to-peer (or distributed) network environment.

The computer system 700 includes a processor 702 (e.g., a central processing unit (CPU), a graphics processing unit (GPU), or both), a main memory 704, and a nonvolatile memory 706 (e.g., volatile RAM and non-volatile RAM, respectively), which communicate with each other via a bus 708. In some embodiments, the computer system 700 can be a desktop computer, a laptop computer, personal digital assistant (PDA), or mobile phone, for example. In one embodiment, the computer system 700 also includes a video display 710, an alphanumeric input device 712 (e.g., a keyboard), a cursor control device 714 (e.g., a mouse), a signal generation device 718 (e.g., a speaker) and a network interface device 720.

In one embodiment, the video display 710 includes a touch sensitive screen for user input. In one embodiment, the touch sensitive screen is used instead of a keyboard and mouse. A machine-readable medium 722 can store one or more sets of instructions 724 (e.g., software) embodying any one or more of the methodologies, functions, or operations described herein. The instructions 724 can also reside, completely or at least partially, within the main memory 704 and/or within the processor 702 during execution thereof by the computer system 700. The instructions 724 can further be transmitted or received over a network 740 via the network interface device 720. In some embodiments, the machine-readable medium 722 also includes a database 730.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 706 may also be a random access memory. The non-volatile memory 706 can be a local device coupled directly to the rest of the components in the computer system 700. A non-volatile memory that is remote from the system, such as a network storage device coupled to any of the computer systems described herein through a network interface such as a modem or Ethernet interface, can also be used.

While the machine-readable medium 722 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present technology. Examples of machine-readable media (or computer-readable media) include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

In general, routines executed to implement the embodiments of the invention can be implemented as part of an operating system or a specific application, component, program, object, module, or sequence of instructions referred to as "programs" or "applications." For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 600 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine- or computer-readable media used to actually affect the distribution.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment," "an embodiment," "other embodiments," "another embodiment," "in some embodiments," "in various embodiments," "in an example," "in one implementation," or the like means that a particular feature, design, structure, or characteristic described in connection with the embodiment is included in at least one embodiment of the technology. The appearances of, for example, the phrases "according to an embodiment," "in one embodiment," "in an embodiment," "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

It should also be understood that a variety of changes may be made without departing from the essence of the invention. Such changes are also implicitly included in the description. They still fall within the scope of this invention. It should be understood that this technology is intended to yield a patent covering numerous aspects of the invention, both independently and as an overall system, and in method, computer readable medium, and apparatus modes.

Further, each of the various elements of the invention and claims may also be achieved in a variety of manners. This technology should be understood to encompass each such variation, be it a variation of an embodiment of any apparatus (or system) embodiment, a method or process embodiment, a computer readable medium embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the technology of the embodiments of the invention is intended to be illustrative, but not limiting, of the scope of the invention, which is set forth in the following claims.

What is claimed is:

1. A computer-implemented method comprising:
    determining, by a computing system, that a first portion of a sign in an environment of a vehicle instructs movement of the vehicle that is inconsistent with a standard, wherein the standard is a navigation rule associated with at least one of vehicle safety, fuel economy, or comfortability;
    determining, by the computing system, a second portion of the sign is unrecognized;
    not performing, by the computing system, movement of the vehicle based on the second portion of the sign;
    providing, by the computing system, a request to an operations center remote from the vehicle for authorization to perform the movement; and
    causing, by the computing system, performance of the movement of the vehicle in response to receipt of authorization to perform the movement.

2. The computer-implemented method of claim 1, further comprising:
    providing to the operations center sensor data associated with features of the second portion of the sign and scenario context data.

3. The computer-implemented method of claim 1, wherein the standard provides that a vehicle should not cross into a lane of oncoming traffic.

4. The computer-implemented method of claim 1, further comprising:
    receiving from the operations center the authorization to perform the movement of the vehicle, wherein the authorization is based on an associated scenario context and environmental conditions.

5. The computer-implemented method of claim 4, further comprising:
    determining that the second portion of the sign is recognized; and
    updating a local map associated with the vehicle to reflect the second portion of the sign and features associated with the second portion of the sign.

6. The computer-implemented method of claim 1, further comprising:
    obtaining sensor data associated with performance of the movement of the vehicle;
    generating assessment data including safety data associated with the performance of the movement of the vehicle; and
    providing the assessment data to the operations center to train a central machine learning model.

7. The computer-implemented method of claim 6, wherein the central machine learning model is configured to recognize variable signage and retrained based on the assessment data generated by the vehicle and other assessment data generated by other vehicles in a fleet.

8. The computer-implemented method of claim 1, wherein the determining that the second portion of the sign is unrecognized comprises:
    extracting from the sign a first sign element that is recognized by a local machine learning model; and
    extracting from the sign a second sign element that is unrecognized by the local machine learning model.

9. A system comprising:
    at least one processor; and
    a memory storing instructions that, when executed by the at least one processor, cause the system to perform operations comprising:
    determining that a first portion of a sign in an environment of a vehicle instructs movement of the vehicle that is inconsistent with a standard, wherein the standard is a navigation rule associated with at least one of vehicle safety, fuel economy, or comfortability;
    determining a second portion of the sign is unrecognized;
    not performing movement of the vehicle based on the second portion of the sign;
    providing a request to an operations center remote from the vehicle for authorization to perform the movement; and
    causing performance of the movement of the vehicle in response to receipt of authorization to perform the movement.

10. The system of claim 9, wherein the operations further comprise:
    providing to the operations center sensor data associated with features of the second portion of the sign and scenario context data.

11. The system of claim 9, wherein the standard provides that a vehicle should not cross into a lane of oncoming traffic.

12. The system of claim 9, the operations further comprising:

receiving from the operations center the authorization to perform the movement of the vehicle, wherein the authorization is based on an associated scenario context and environmental conditions.

13. The system of claim 9, further comprising:

obtaining sensor data associated with performance of the movement of the vehicle;

generating assessment data including safety data associated with the performance of the movement of the vehicle; and providing the assessment data to the operations center to train a central machine learning model.

14. The system of claim 13, wherein the central machine learning model is configured to recognize variable signage and retrained based on the assessment data generated by the vehicle and other assessment data generated by other vehicles in a fleet.

15. A non-transitory computer-readable storage medium including instructions that, when executed by at least one processor of a computing system, cause the computing system to perform operations comprising:

determining that a first portion of a sign in an environment of a vehicle instructs movement of the vehicle that is inconsistent with a standard, wherein the standard is a navigation rule associated with at least one of vehicle safety, fuel economy, or comfortability;

determining a second portion of the sign is unrecognized;

not performing movement of the vehicle based on the second portion of the sign;

providing a request to an operations center remote from the vehicle for authorization to perform the movement; and causing performance of the movement of the vehicle in response to receipt of authorization to perform the movement.

16. The non-transitory computer-readable storage medium of claim 15, wherein the operations further comprise:

providing to the operations center sensor data associated with features of the second portion of the sign and scenario context data.

17. The non-transitory computer-readable storage medium of claim 15, wherein the standard provides that a vehicle should not cross into a lane of oncoming traffic.

18. The non-transitory computer-readable storage medium of claim 15, the operations further comprising:

receiving from the operations center the authorization to perform the movement of the vehicle, wherein the authorization is based on an associated scenario context and environmental conditions.

19. The non-transitory computer-readable storage medium of claim 15, further comprising:

obtaining sensor data associated with performance of the movement of the vehicle;

generating assessment data including safety data associated with the performance of the movement of the vehicle; and providing the assessment data to the operations center to train a central machine learning model.

20. The non-transitory computer-readable storage medium of claim 19, wherein the central machine learning model is configured to recognize variable signage and retrained based on the assessment data generated by the vehicle and other assessment data generated by other vehicles in a fleet.

\*  \*  \*  \*  \*